No. 647,152.  
E. W. PALMER.  
VEHICLE RUB IRON.  
(Application filed July 12, 1899.)  
Patented Apr. 10, 1900.

(No Model.)

WITNESSES  
INVENTOR  
E. W. Palmer  
BY  
ATTORNEYS

UNITED STATES PATENT OFFICE.

ELISHA WILLIAM PALMER, OF FULLERTON, CALIFORNIA.

VEHICLE RUB-IRON.

SPECIFICATION forming part of Letters Patent No. 647,152, dated April 10, 1900.

Application filed July 12, 1899. Serial No. 723,552. (No model.)

*To all whom it may concern:*

Be it known that I, ELISHA WILLIAM PALMER, of Fullerton, in the county of Orange and State of California, have invented a new and Improved Vehicle Rub-Iron, of which the following is a full, clear, and exact description.

My invention relates to that class of chafe or rub irons having rollers adapted for attachment to the bodies or running-gear of vehicles.

One object of the invention is to provide an iron of this class that will effectually prevent the front wheels from wearing away the body or the running-gear of wagons or unduly wearing itself away when said wheels are cramped, the device likewise serving to prevent the front wheels catching under the body of the vehicle and upsetting it.

A further object of the invention is to construct a roller for a rub-iron so that it may be made quite short and so that a wheel cannot slip rearwardly from the roller, and also so that the wheel in engagement with the roller will obtain a good bearing thereon.

Another object of the invention is to provide a device of the character described that will be simple, durable, economic, and readily applied, and also to provide means whereby the device will be prevented from rattling when idle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
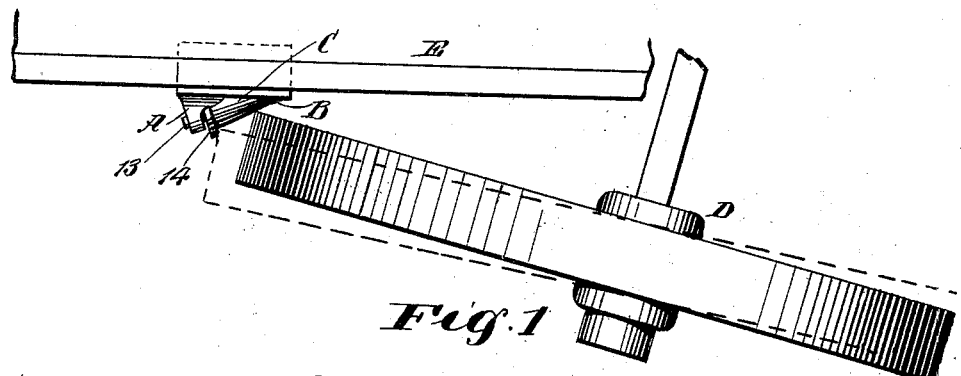
Figure 2:
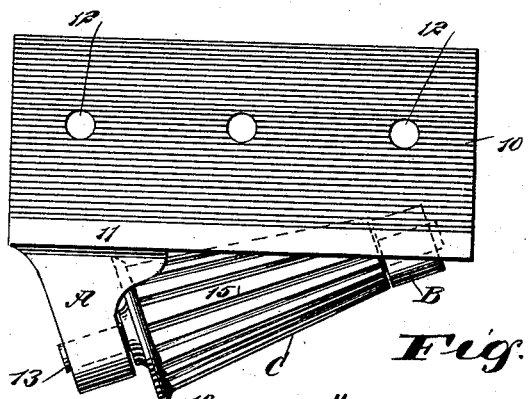
Figure 3:
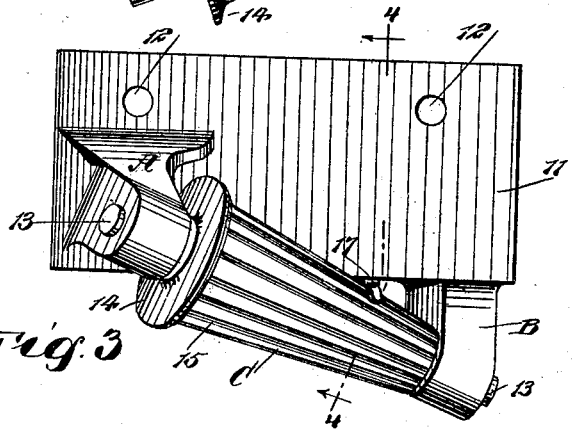
Figures 4, 5:
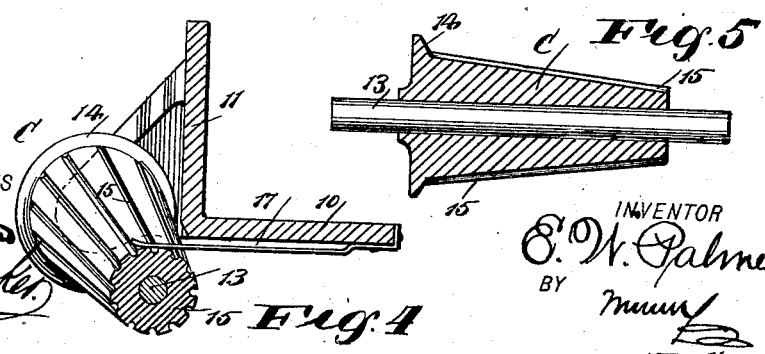

Figure 1 is a plan view of a portion of the body of a vehicle, a front wheel, and the device applied to the body, the wheel showing in engagement with the device. Fig. 2 is a plan view of the device drawn on a larger scale. Fig. 3 is a front elevation of the device. Fig. 4 is a vertical transverse section taken practically on the line 4 4 of Fig. 3; and Fig. 5 is a longitudinal section through the roller of the device, illustrating the spindle of the roller in side elevation.

The body or support of the device is in the nature of an angle-iron, comprising a horizontal member 10 and a vertical member 11, both members having apertures 12 therein adapted to receive screws, bolts, or like fastening devices. A hanger A is secured to the outer face of the vertical member 11 of the support, the said hanger having a downward and forward tip and being located near one end of the said member 11, as illustrated particularly in Fig. 3. A second hanger B is attached to the under surface of the horizontal member 10, and the hanger B extends not only downwardly, but is given a slight twist in the same direction as the hanger A.

A spindle 13 is mounted to turn in the hangers A and B, and therefore the said spindle has a downward and forward inclination and likewise a lateral inclination with respect to the said angular support, the rear end of the spindle being some distance in front of the support, while the forward end of the spindle is beneath the support. A roller C is secured on the said spindle 13. This roller is conical, its larger end being the rear end, and the said roller is provided at its rear end with a marginal flange 14 and with grooves or corrugations 15, longitudinally made in its periphery. By giving the roller the inclined position shown and tapering said roller the roller may be readily engaged by the tire of the front wheel D, as shown in Fig. 1, and the flange 14 at the rear end of the roller effectually prevents a wheel that may be brought in engagement with the roller from slipping off at the rear, while the corrugated surface of the roller enables the tire of the wheel to obtain a bite thereon.

The inclination of the roller and its conical shape are not great enough to direct a wheel toward the forward end of the roller on account of the downward inclination of said roller; but when the wheel first engages with the roller C it should strike the said roller about midway of its ends, and by reason of the play of the wheel upon its axle the rim of the wheel will be directed backward toward the flange 14. The vertical member of the support for the roller and its bearings is attached to the outer face of the side E of the vehicle near the front, while the bottom member 10 of the support is secured to the bottom surface of the vehicle-body.

When idle, the roller is prevented from rattling by a spring 17 being brought to an engagement with the peripheral surface of the roller, preferably at a point near where the roller passes beneath the support, the said spring being secured at its inner end in any desired manner to the horizontal member of said support, as is clearly illustrated in Fig. 4.

Having thus described my invention, I claim as new and desire to secure by Letters Patent—

1. A rub-iron consisting of an angular attaching-plate having hangers attached one to its front and the other to its bottom member, both hangers having a forward tip, a spindle carried by the said hangers, and a conical roller mounted on the said spindle, the said roller being provided with a flange at its wider or rear end, the said roller being so placed that it is laterally at an angle to the front of the attaching-plate and at an angle to the under member of said attaching-plate, for the purposes set forth.

2. In a rub-iron, the combination, with an angular attaching plate or support, a hanger secured to the front or vertical member of the said angle-plate, the said hanger having a downward and a forward tip, and a second hanger pendent from the under face of the said attaching-plate, having likewise a slight forward and downward pitch, of a spindle carried by the said hangers, a conical roller mounted to revolve on the said spindle, the conical roller having a flange at its rear and wider end, the roller being furthermore provided with longitudinal corrugations, and a tension device secured to the attaching-plate and having bearing upon the said roller, said tension device being adapted to prevent the roller from rattling when not in use, as set forth.

ELISHA WILLIAM PALMER.

Witnesses:
  WM. STARBUCK,
  E. W. DEAN.